J. LEDWINKA.
TROLLEY.
APPLICATION FILED NOV. 11, 1905. RENEWED OCT. 8, 1908.
933,084.
Patented Sept. 7, 1909.
3 SHEETS—SHEET 2.
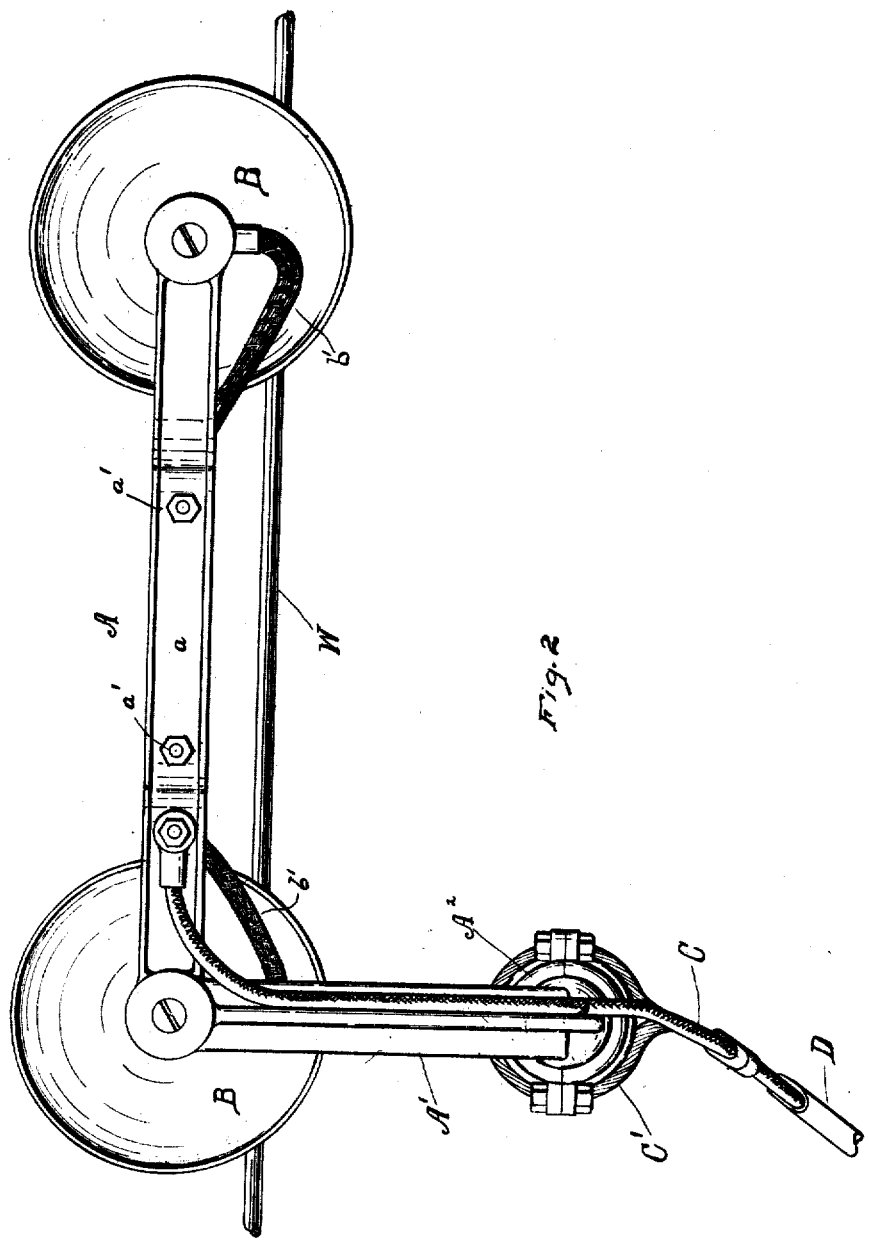
WITNESSES
D. Davies
Jno. F. Oberlin.
INVENTOR
Joseph Ledwinka
BY 
ATTORNEY

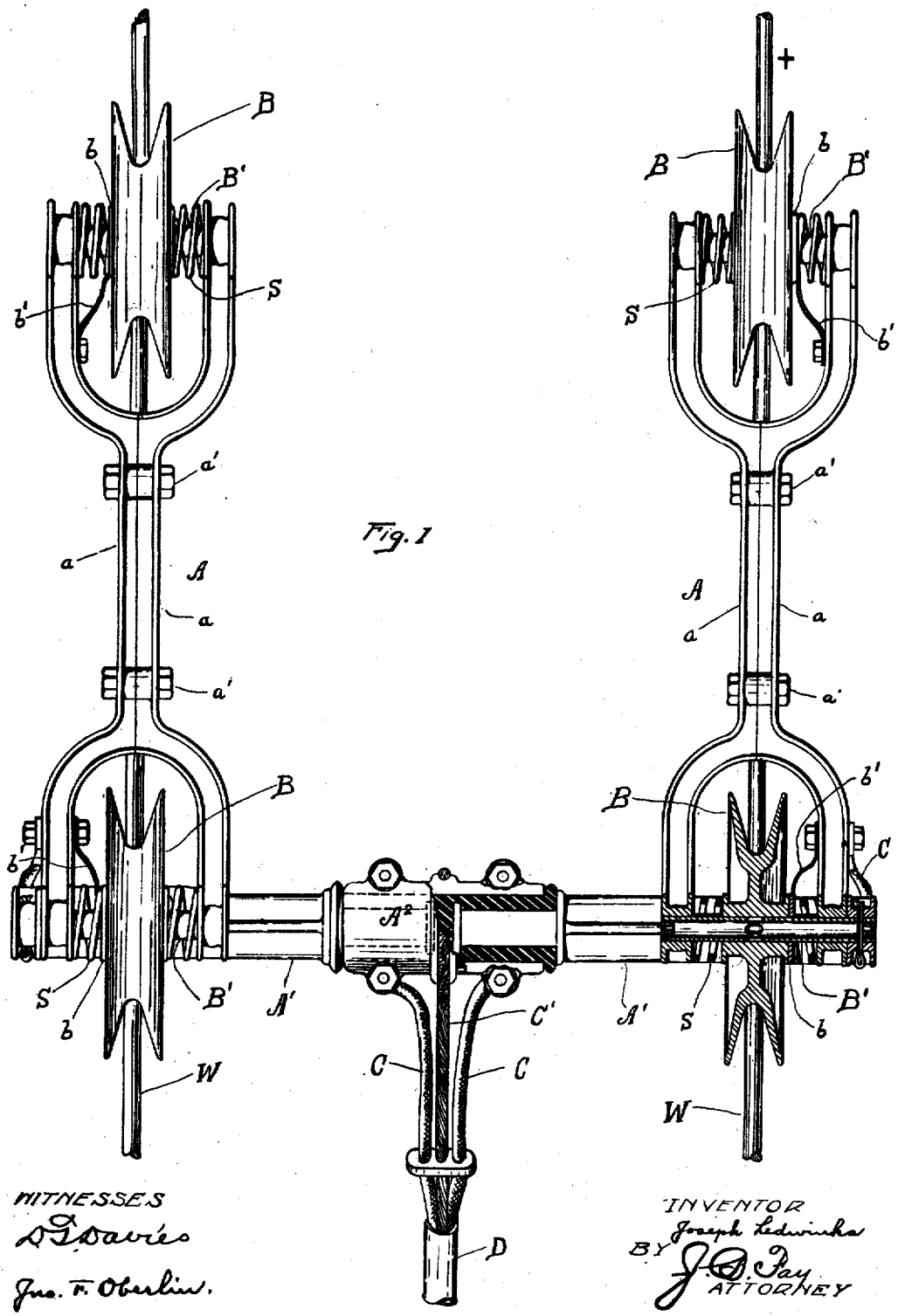

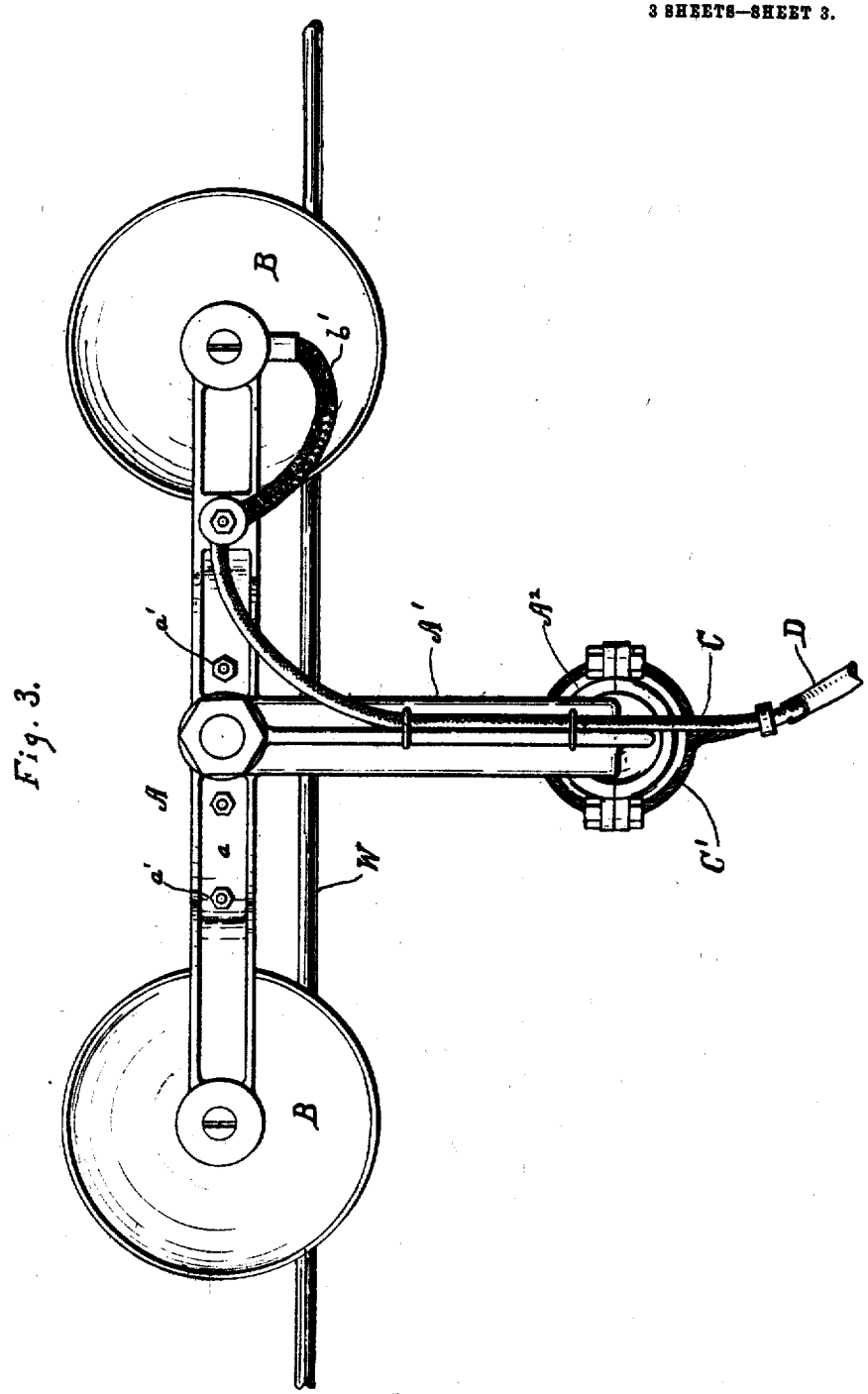

UNITED STATES PATENT OFFICE.

JOSEPH LEDWINKA, OF PHILADELPHIA, PENNSYLVANIA.

TROLLEY.

933,084.  Specification of Letters Patent.  Patented Sept. 7, 1909.

Application filed November 11, 1905, Serial No. 286,787. Renewed October 8, 1908. Serial No. 456,773.

*To all whom it may concern:*

Be it known that I, JOSEPH LEDWINKA, a subject of the Emperor of Austria-Hungary, resident of Philadelphia, county of Philadelphia, and State of Pennsylvania, have invented a new and useful Improvement in Trolleys, of which the following is a specification, the principle of the invention being herein explained and the best mode in which I have contemplated applying that principle, so as to distinguish it from other inventions.

My invention relates to improvements in trolleys, and particularly to improvements in so-called "trackless trolleys", *i. e.* trolleys designed for use in connection with electric motor-vehicles which derive the current whereby they are propelled from overhead wires, but which do not run on a fixed track. Obviously a more flexible connection must be provided between the vehicle and the trolley than the rigid trolley pole employed in connection with street cars and hence the trolley must be constructed so as to remain in contact with the wires without support from below. The object of my invention, then, is to supply a trolley that shall satisfactorily fulfil the above and other requirements peculiar to the situation; and to this end it consists of means hereinafter fully described and particularly set forth in the claims.

The annexed drawings and the following description set forth in detail certain mechanism embodying the invention, such disclosed means constituting but one of various mechanical forms in which the principle of the invention may be used.

In said annexed drawings:—Figure 1 represents a plan view of my improved trolley, one of the wheels being shown in cross-section; Fig. 2 represents a side elevation of the trolley; while Fig. 3 is a side elevation of a slightly modified form of my invention.

The frame of my improved trolley, as clearly shown in Figs. 1 and 3, comprises two similar members A, which are joined together to form a sort of truck. A pair of grooved trolley wheels B are mounted tandem fashion in each member A whereby the frame is movably supported upon the two parallel trolley wires W and through which electrical contact is made therewith. The two members A of the frame are insulated from each other, and two independent current-carrying cables C suitably connected with each member are adapted to conduct the current to the motor of the vehicle to be driven. These cables C are included, together with a third supporting-cable C′ within a suitable insulating tube D, such supporting-cable C′ serving further as a traction cable whereby the trolley is drawn after the vehicle without subjecting the current-carrying cables to unnecessary strain.

I shall now proceed to set forth the detailed structure of my trolley.

Each frame member A is made up of two like parts $a$ secured together near their centers by bolts $a'$ and with divergent ends forming the harps within which the trolley wheels B are mounted. Such wheels B, which are of the familiar grooved type in common use, are rotatably mounted upon axles B′ secured in the harps formed by frame members A, in the manner clearly shown in Fig. 1. As there appears, it will be observed that the wheel B is longitudinally movable along its axle B′, since it does not occupy nearly all the space between the confining arms of the harp. Normally, however, the wheel is maintained at or near the center of its axle by means of helical springs S, disposed as shown. The purpose served by this arrangement will appear shortly.

Pivotally connected to each of frame members A is a pendent, inwardly bent, arm A′. The two arms A′ are secured independently of each other at their lower ends in a cylindrical block of insulating material inclosed and strengthened by a metal covering A². It is to this covering A² that the traction cable C″ is attached. The particular point on frame member A to which arm A′ is pivotally attached is not material; I find it convenient, however, to thus attach it to the axle on which the forward trolley wheel B rotates. This construction is illustrated in Figs. 1 and 2, while Fig. 3 shows the arrangement when the attachment is at the center of the frame instead of at the end. It would not be advisable to have this point of attachment farther back than the center since the forward wheel would then be apt to jump the wire. The frame members A being insulated from each other, each serves to electrically connect the two wheels mounted therein with the respective current-carrying cable C. Each cable is attached to its corresponding frame member where most convenient and in the usual manner. To insure a good electrical connection between the trolley wheels and the frame a washer $b$ is mounted on the axle B' between each wheel and corresponding spring S, and is connected with the part $a'$ of frame member A to which cable C is attached by means of a flexible conductor $b'$. By this arrangement the washer $b$ is always held in close frictional contact with the wheel.

The operation of the several parts of my improved trolley when in actual use is readily indicated. The trolley wires W are, of course, supported from suitable brackets or hangers so as to permit the passage freely along them of the trolley frame. The frame is thus drawn along the wires by means of traction cable C' connecting it with the motor-vehicle. From the manner in which members A are attached to arms A', which as has been shown, are rigidly connected so as to form an integral structure, it is obvious that such members can vibrate independently of each other in a vertical plane to accommodate themselves to the varying inclination of the separate trolley wires. The equivalent of lateral flexibility in the frame structure is obtained by my manner of mounting the trolley wheels therein, whereby as has already been explained, they are movable longitudinally along their axles while normally held centered thereon by springs S.

It will be seen that by the above departures in the structure and principle of operation of trackless trolleys of this type, I overcome the difficulties that have hitherto been encountered in their use. Thus the frame of the truck is adapted to conform perfectly with all the various inequalities that are present in trolley lines, even when most carefully erected, and that, without sacrificing any of the rigidity essential to the frame's durability. And by so assuring its conformity with the wire, good electrical contact is maintained and the danger of the truck falling from the wire is reduced to a minimum.

Having thus described my invention in detail, that which I particularly point out and distinctly claim is:

1. The combination with two trolley wires, of a trolley comprising a cross-arm made up of two portions insulated from each other, a frame-member transversely pivotally attached to each such portion, wheels mounted tandem fashion in each of said frame members, such wheels being movable longitudinally of their axles, means normally positioning said wheels on their respective axles, and current-carrying means connecting each of said frame-members with the vehicle to be driven.

2. The combination with two parallel trolley wires, of a trolley comprising a cross-arm made up of two portions insulated from each other, a frame-member pivotally attached to each such portion so as to oscillate vertically, two grooved wheels mounted tandem fashion in each of said frame-members, such wheels being movable longitudinally on their axles, springs disposed on each side of said wheels and tending to center them on their respective axles, and current-carrying means connecting each of said frame-members with the vehicle to be driven.

3. The combination with two trolley wires, of a trolley comprising a cross-arm made up of two portions insulated from each other, a frame-member pivotally attached to each such portion so as to oscillate vertically, two grooved wheels mounted tandem-fashion in each of said frame-members, such wheels being movable longitudinally on their axles, springs disposed on each side of said wheels and tending to center them on their respective axles, washers interposed between said wheels and springs, and electrical conductors connecting said wheels with the corresponding frame-members and such frame-members with the vehicle to be driven.

Signed by me, this 31st day of October, 1905.

JOSEPH LEDWINKA.

Attested by:
Geo. H. Cann,
Lillian M. Hudnut.